United States Patent [19]
Cooper et al.

[11] Patent Number: 5,428,390
[45] Date of Patent: Jun. 27, 1995

[54] APPARATUS AND METHOD FOR FOCAL PLANE ZOOM AND PAN

[75] Inventors: Alan N. Cooper, Coppell; Jaroslav Hynecek, Richardson, both of Tex.

[73] Assignee: Texas Instruments Incorporated, Dallas, Tex.

[21] Appl. No.: 185,663

[22] Filed: Jan. 21, 1994

[51] Int. Cl.⁶ .................. H04N 5/232; H04N 5/262; H04N 5/335
[52] U.S. Cl. .................. 348/240; 348/239; 348/302; 348/581; 348/39
[58] Field of Search .......... 348/240, 239, 222, 302, 348/303, 304, 305, 581, 561, 580, 562, 578, 704, 722, 294, 298, 299, 332, 324, 319, 320, 321, 322, 36, 39, 169; H04N 5/232, 5/262, 5/222, 5/225, 5/335; 257/231-233; 377/60

[56] References Cited

U.S. PATENT DOCUMENTS

| | | | |
|---|---|---|---|
| 4,002,824 | 1/1977 | Petrocelli et al. | 348/240 |
| 4,819,070 | 4/1989 | Hynecek | 348/240 X |
| 4,831,451 | 5/1989 | Hynecek | 348/240 X |
| 4,910,599 | 3/1990 | Hashimoto | 348/240 |
| 4,951,125 | 8/1990 | Kojima et al. | 348/561 X |
| 4,991,022 | 2/1991 | Canfield et al. | 348/561 X |
| 5,019,912 | 5/1991 | Matsuda | 348/240 |
| 5,243,433 | 9/1993 | Hailey et al. | 348/340 |
| 5,253,064 | 10/1993 | Yamamoto et al. | 348/581 X |

*Primary Examiner*—James J. Groody
*Assistant Examiner*—Safet Metjahic
*Attorney, Agent, or Firm*—Alan K. Stewart; Richard L. Donaldson; William E. Hiller

[57] ABSTRACT

The apparatus (10) performs pan and zoom functions in conjunction with an electronic image sensor (18) with an image area (72, 92, 112) in which a plurality of lines and columns of pixel data are generated by impinging light. Pan and zoom commands are generated by an input device (12) in response to operator input or commands from a microprocessor and the like. A vertical indexing circuitry (14, 16, 64, 72, 76, 86) is coupled to the image sensor (18) and selectively transfers from the image area (72, 92, 112) a number of successive lines of pixel data in response to the pan and zoom commands. A horizontal indexing circuitry (14, 16, 62, 66, 80, 100, 116) is coupled to the vertical indexing circuitry for receiving the selected number of successive lines of pixel data and further selecting a number of successive columns of pixel data therefrom for display in response to the pan and zoom commands.

18 Claims, 5 Drawing Sheets

APPARATUS AND METHOD FOR FOCAL PLANE ZOOM AND PAN

CROSS-REFERENCE TO RELATED APPLICATIONS

This application is related to:
U.S. patent application Ser. No. 08/184,794, entitled APPARATUS AND METHOD FOR ELECTRONIC IMAGE CENTERING, filed Jan. 20, 1994.

TECHNICAL FIELD OF THE INVENTION

This invention relates in general to the field of electronic image processing systems. More particularly, the present invention relates to apparatus and a method for focal plane zoom and pan.

BACKGROUND OF THE INVENTION

The technology of electronic image sensors has continued to improve and yield products of increasingly higher resolution and data rates. In comparison, current video display technology lags behind and is further limited by standard industry formats. As a result, current display technology does not take full advantage of the capabilities of the high performance image sensors or uses techniques that are inefficient and not cost effective.

For example, to accomplish digital zooming, all of the image data is read from a high resolution image sensor, digitized by analog-to-digital converters, and stored in a memory. Subsequently, the memory is addressed and accessed to read a selected portion of the image data to compose the zoomed picture on a standard resolution display. Therefore, a penalty is assessed for using a high resolution image sensor in speed, cost and size of the system.

Panning is a typical camera operation in which the camera is moved so that the field of view is changed along the horizontal or vertical axis. This camera move is often used to convey a better sense of the surroundings or a sense of height or depth. In surveillance applications, limited horizontal panning is often used to widen the scope of each camera's surveillance territory. Because actuation of the video camera mount is typically used to pan the camera, it is subject to wear and mechanical failures. Therefore, it would be beneficial to take advantage of the high performance and full capabilities of electronic image sensors to achieve panning without the need for mechanical control and actuation.

SUMMARY OF THE INVENTION

In accordance with the present invention, apparatus and a method for electronic image zooming and panning are provided which substantially eliminate or reduce disadvantages and problems associated with prior systems and methods.

In one aspect of the present invention, an image processing system is provided that includes an image sensor with an image area generating a plurality of lines and columns of pixel data. In response to operator inputs indicating the pan and/or zoom function, a timing controller coupled to the image sensor generates an image area timing signal and an index register timing signal. A number of successive lines of pixel data are selected by vertically indexing into the plurality lines of pixel data as timed by the image area timing signal, and transferring to an index register. The index register then horizontally indexes the selected lines of pixel data for further selecting columns thereof in response to the index register timing signal. The vertically and horizontally indexed lines and columns of pixel data then may be displayed.

In another aspect of the present invention, the apparatus performs pan and zoom functions in conjunction with an image sensor with an image area in which a plurality of lines and columns of pixel data are generated by impinging light. Pan and zoom commands are generated by an input device in response to operator input or commands from a microprocessor and the like. A vertical indexing circuitry is coupled to the image sensor and selectively transfers from the image area a number of successive lines of pixel data in response to the pan and zoom commands. A horizontal indexing circuitry is coupled to the vertical indexing circuitry for receiving the selected number of successive lines of pixel data and further selecting a number of successive columns of pixel data therefrom for display in response to the pan and zoom commands.

In yet another aspect of the present invention, a method for performing pan and zoom functions includes the steps of receiving pan and zoom commands from an operator or microprocessor. A plurality of lines and columns of pixel data are generated in an image area of an image sensor, and a number of successive lines of pixel data are selectively transferred from the image area in response to the pan and zoom commands. From the selected number of successive lines of pixel data, a number of successive columns of pixel data are selected for display in response to the pan and zoom commands.

BRIEF DESCRIPTION OF THE DRAWINGS

For a better understanding of the present invention, reference may be made to the accompanying drawings, in which.

DETAILED DESCRIPTION OF THE INVENTION

Figure 1:
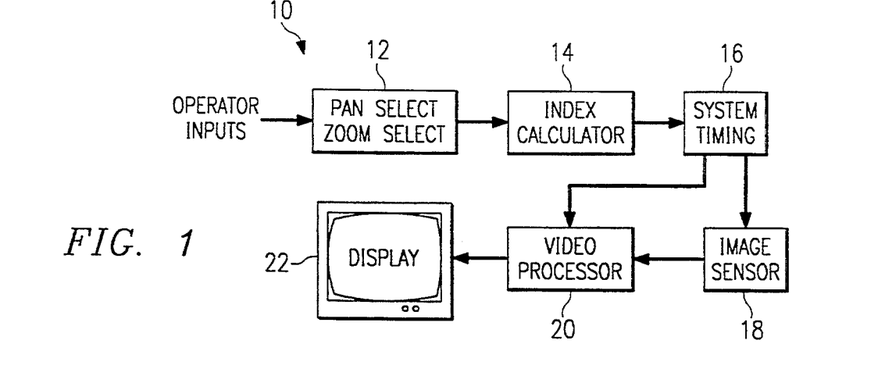
FIG. 1 is a simplified top level block diagram of an embodiment of the present invention.

Apparatus for electronic image zooming and panning 10 includes a pan and zoom select device 12 which enables an operator to select the mode of operation and indicate the magnitude of the operation. Pan and zoom select device 12 thus may receive operator inputs in the form of manual manipulation. Pan and zoom select device 12 may also be a microprocessor or any other devices capable of generating and issuing such commands. The operator input may indicate the direction of panning desired, such as up/down and left/right. Each such input may generate panning in the indicated direction for a predetermined incremental amount. Alternatively, pan select device 12 may generate both a pan directional signal and a value signal to further indicate the amount of panning desired. The zoom operation may be indicated by selecting the amount of zooming desired. Zooming operator input may also be in the form of entering or selecting an integer indicative of the amount of magnification desired in the zooming operation. Any suitable input device or devices may be utilized.

Pan and zoom select device 12 generates the appropriate pan and zoom commands and provides them to an index calculator 14. Index calculator 14 computes and generates the amount of indexing required to accomplish the zoom and/or panning desired. Index calculator 14 then provides the computed indexing values to a system timing circuitry 16, which generates a number of image sensor timing signals in addition to video display timing signals in response to input including the zoom and pan indexing values. Using the timing signals generated by system timing circuitry 16, the image data generated by an image sensor 18 are processed internally and transferred to a video processor 20. The image data are then processed and displayed on a display 22. Accordingly, the timing relationships of the transfer from image sensor 18 and image display 22 are controlled by timing signals generated by system timing circuitry 16.

Focal plane zoom and pan are two operations in which selected portions of a field of view are displayed. Focal plane zoom is performed by selecting a portion of the image data in image sensor 18 and displaying the selected portion over the entire field of view. For example in FIG. 2, an image area of an image sensor contains image data that compose a picture 30 showing the full height of a man. If the full image area contain horizontal lines 0 to N, and vertical lines 0 to L, the selected image portion for focal plane zoom may be designated by horizontal lines a to N-b and vertical lines c to L-d. Focal plane zoom yields a field of view or picture 32 showing only the selected portion of the original picture 30 magnified over the entire field of view.

Figure 3:
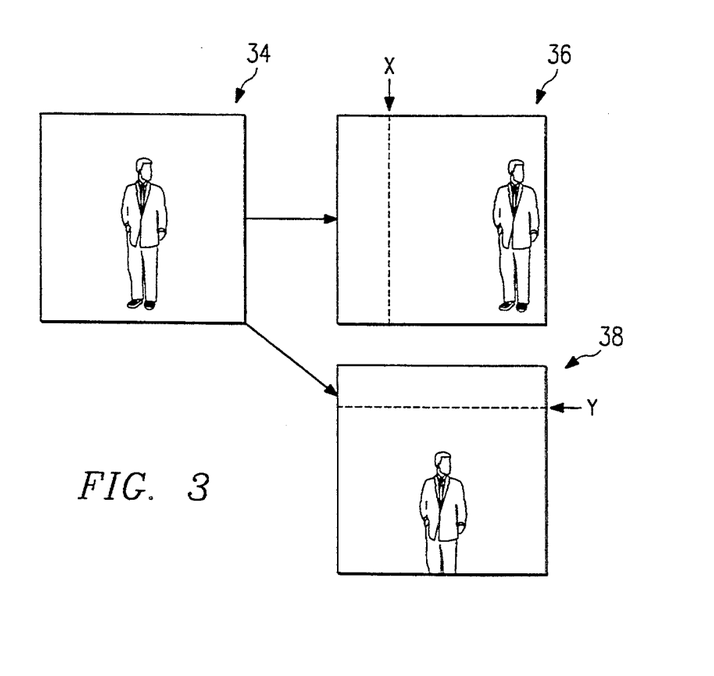
FIG. 3 is a diagram depicting the elements of panning.

Focal plane pan is the ability to move the displayed picture portion over the entire image area either horizontally or vertically to shift the field of view along these axes. If the displayed image 34 is as shown in FIG. 3, a shift of x amount or x vertical lines to the left yields a panned displayed image 36. Similarly, a shift of y amount or y horizontal lines downward yields a panned displayed image 38.

Figure 4:
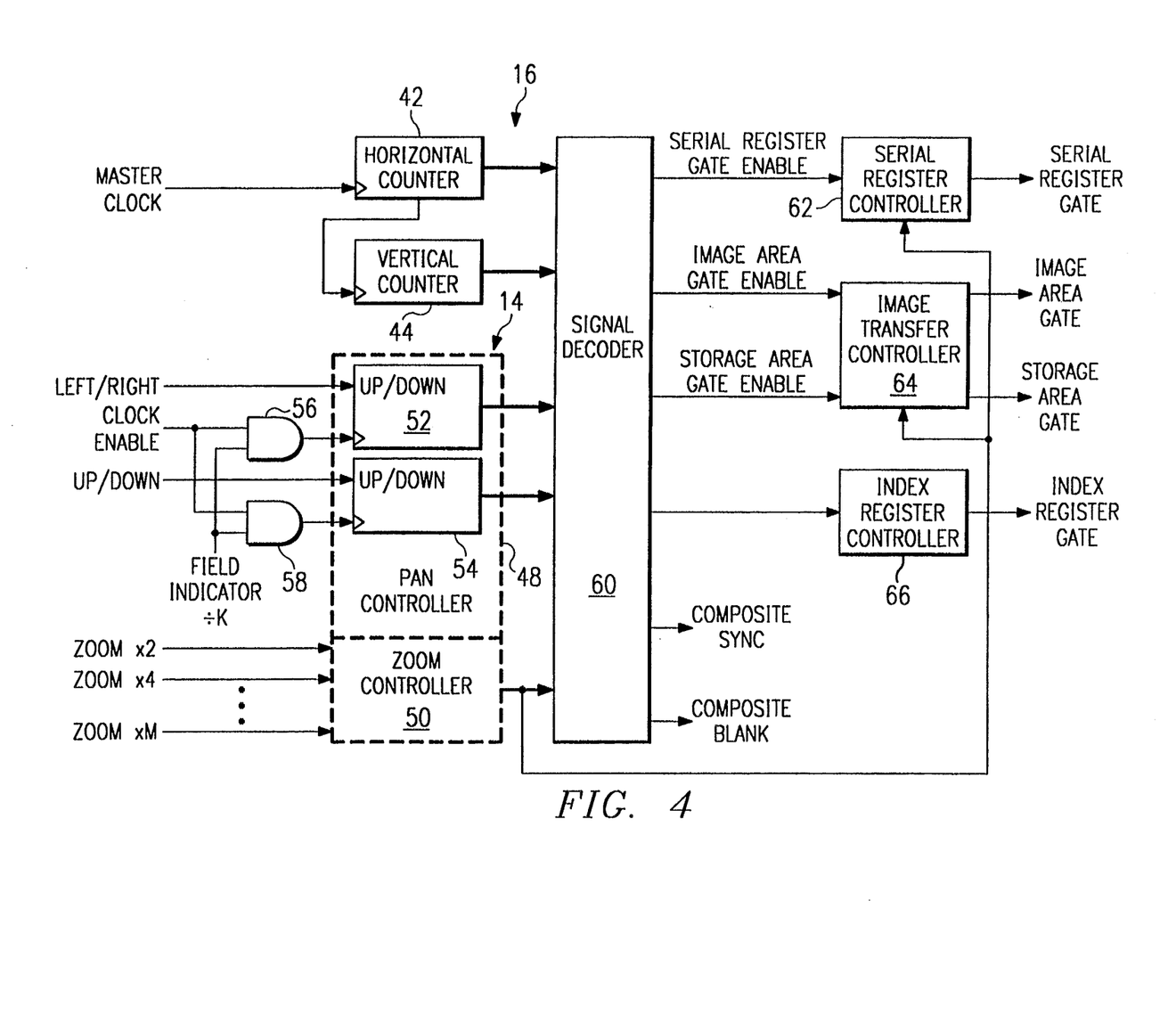
FIG. 4 is a simplified block diagram of an index calculator and system timing circuits.

Referring to FIG. 4, a more detailed schematic block diagram of a timing controller including system timing circuitry 16 and index calculator 14 is shown. A MASTER CLOCK signal is used to drive a horizontal counter circuit 42. Horizontal counter circuit 42 is used to address the position within a single line of a video image. Horizontal counter circuit 80 generates a horizontal count value which is provided to a single decoder 84. Horizontal counter circuit 80 increments its count value as driven by the MASTER CLOCK signal until it reaches a predetermined maximum value and resets. Upon resetting, a horizontal drive signal is generated and provided to a vertical counter circuit 44. Vertical counter circuit 44 increments its vertical count value each time a horizontal counter circuit 80 resets and produces a horizontal drive signal. The vertical count value addresses the number of lines in a video frame and is also provided to signal decoder 60. Signal decoder 60 uses the vertical and horizontal counter values to determine when vertical and horizontal blanking periods occur. Additionally, signal decoder 84 generates video signals such as the composite video, blanking and synchronization signals as known in the art.

In addition, index calculator 14 further provides input related to focal plane zoom and pan to signal decoder 60. Index calculator 14 includes a pan controller 48 and a zoom controller 50. Pan controller 48 receives a directional and/or magnitude input from pan select device 12 (FIG. 1) and computes the amount of indexing required to accomplish the desired panning operation. Pan controller 48 may include an up/down counter 52 that receives an input indicating left or right panning. An AND logic gate 56 may be used to perform a logical AND of a CLOCK ENABLE signal and a FIELD INDICATOR signal divided by a predetermined integer K to control the clock input of up/down counter 52. As known in the art, the FIELD INDICATOR signal is a video display signal that indicates the timing of each field of video frame being processed. The integer K may be any value that yields the proper frequency of pan and zoom index updates. Therefore, as operator input indicates a pan operation to the left or right, up/down counter 52 counts and generates an updated pan index value at each pulse of the FIELD INDICATOR divided by K. The pan index value is provided to signal decoder 60 to generate the proper enable signals to effect the desired panning operation along the horizontal axis.

Similarly, a second up/down counter 54 generates an up/down pan index value provided to signal decoder 60 to generate the proper enable signals to achieve the desired panning operation along the vertical axis. Pan commands from pan select device 12 (FIG. 1) is provided as an input to up/down counter 54, and the clock input thereof also receives the CLOCK ENABLE signal ANDed with the quantity, FIELD INDICATOR signal divided by K, by an AND gate 58. Similarly, as the input indicates a pan operation upward or downward, up/down counter 54 counts and generates an updated pan index value at each pulse of the FIELD INDICATOR divided by K.

Index calculator 14 further includes a zoom controller 50 which receives zoom select commands from zoom select device 12 (FIG. 1). As shown, zooming may be limited to certain specific magnifications, $\times 2$, $\times 4$, up to $\times M$, for example, where the degree of magnification is limited largely by the resolution of image sensor 18 (FIG. 1) compared with that of display 22.

Signal decoder 60 receives the horizontal and vertical count values from horizontal counter 42 and vertical counter 44, and the pan and zoom index values from pan controller 48 and zoom controller 50 and generates a number of enable signals from which image sensor and video display timing signals and relationships are produced. Coupled to signal decoder 60 and receiving the enable signals therefrom are serial register controller 62, image transfer controller 64, and index register controller 66. Image transfer controller 64 receives an IMAGE AREA GATE ENABLE signal from signal decoder 60 and generates appropriate timing pulses IMAGE AREA GATE and STORAGE AREA GATE to control the transfer of image data from the image area and storage area of image sensor 18. The image data in the storage area of image sensor 18 are then typically transferred to at least one serial register from which the data are serially read to the video processor. Serial register controller 62 receives a SERIAL REGISTER GATE ENABLE signal from signal decoder 60 and generates appropriate timing pulses SERIAL REGISTER GATE to control the serial output from the serial register of image sensor 18.

To perform focal plane zoom and pan, index register controller 66 is provided to generate an INDEX REGISTER GATE timing signal to control the vertical and horizontal indexing of the image data. The function of index register controller 66, the INDEX REGISTER GATE timing signal, and the associated index registers are described in detail below. As shown in FIG. 4, serial register controller 62 and image transfer controller 64 also receive zoom index values from zoom controller 50 to index the image data properly in order to perform the zoom function.

Figure 5:
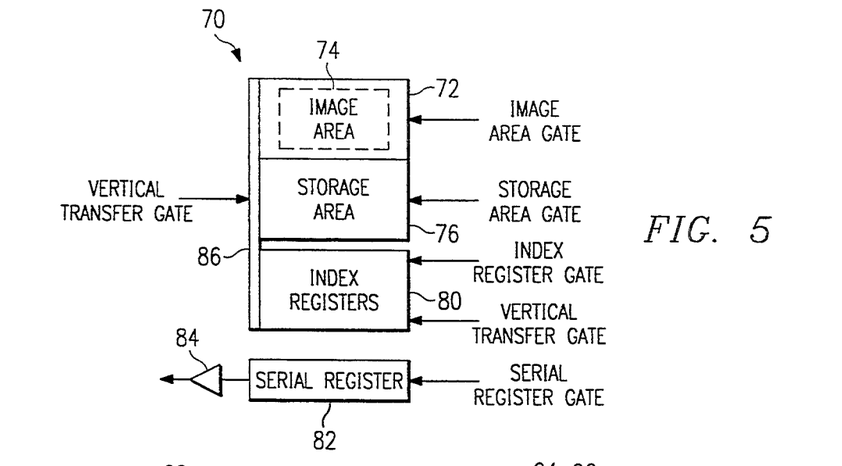
FIG. 5 is a simplified block diagram of an embodiment of the present invention as applied to a frame transfer image sensor.
Figure 6:
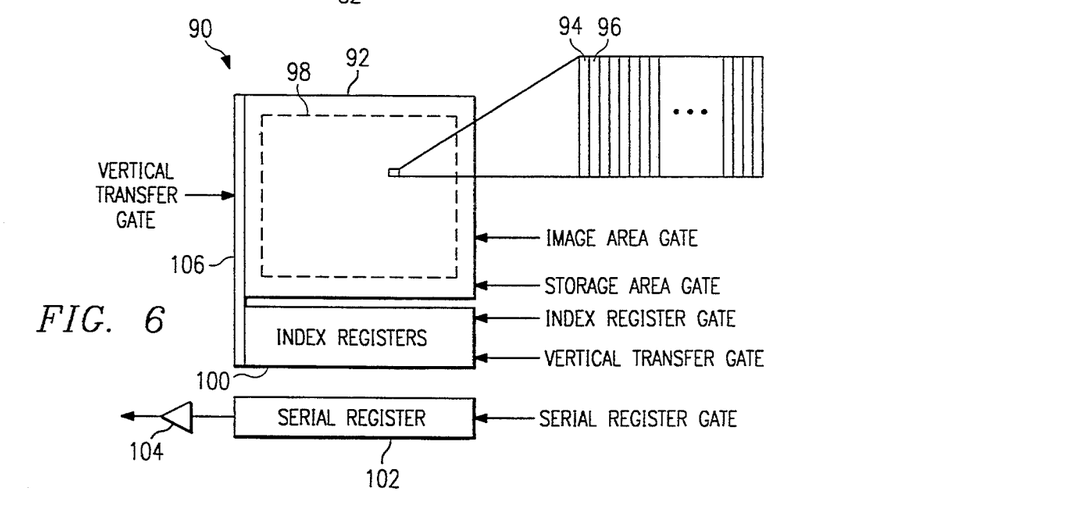
FIG. 6 is a simplified block diagram of an embodiment of the present invention as applied to an interline image sensor.
Figure 7:
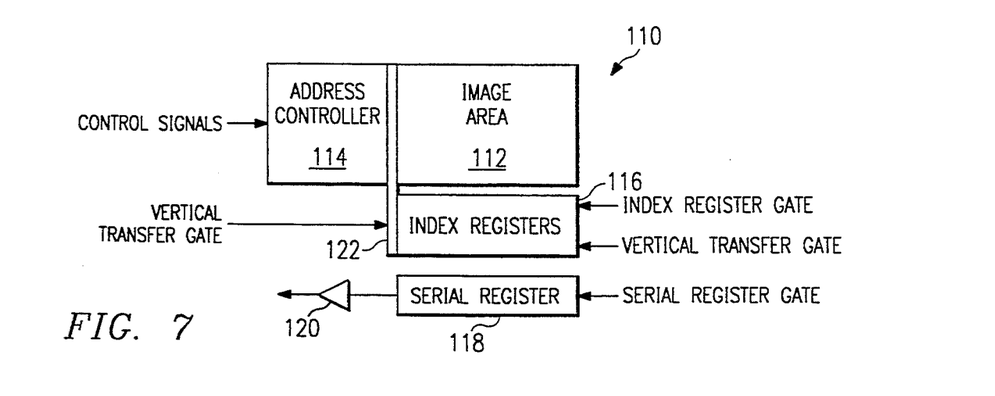
FIG. 7 is a simplified block diagram of an embodiment of the present invention as applied to a line addressable image sensor.

Referring to FIGS. 5–7, a frame transfer image sensor 70, an interline or interdigitated image sensor 90, and a MOS-based line addressable image sensor 110 are shown with respective main components receiving the various timing signals generated by controllers 62–66.

As shown in FIG. 5, frame transfer image sensor 70 includes an image area 72 with an inner boundary 74 shown to represent the additional area available along the horizontal and vertical axes for the panning operation. As light impinges on image area 72, image or pixel data, in the form of electron charges captured in potential wells, are formed. As a charge-coupled device, the electron charges are transferred in parallel or in packets to a storage area 76. The parallel image area-to-storage area transfer is controlled and timed by the IMAGE AREA GATE signal. The transferred image data are then moved line-by-line from storage area 76 to index registers 80 as controlled and timed by the STORAGE AREA GATE signal. The transfer of the image data through successive stages of index registers 80 and into a serial register 82 is controlled and timed by INDEX REGISTER GATE and VERTICAL TRANSFER GATE signals. Finally, the serial output of serial register 82 to an amplifier 84 is controlled by SERIAL REGISTER GATE signal. Vertical transfer registers 86 may be further provided to move dark reference pixels along the left edge of image area 72, storage area 80 and index registers 80 to serial register 82 without indexing to preserve their predetermined position. Dark reference pixels located at other locations of image area 72 may be similarly handled. Dark reference pixels are typically generated with known predetermined positions in the image sensors and used as a reference for a dark value in video processing as known in the art.

Referring to FIG. 6, interline image sensor 90 includes an image and storage area 92 where single-pixel-wide image sections 94 are interlined with single-pixel-wide storage sections 96. Therefore, instead of requiring multiple IMAGE AREA GATE pulses to parallel transfer all of the image data to the storage area, only one clock pulse is needed to accomplish the same. Similarly, an inner boundary 98 is shown to indicate the range of panning allowed. The image data may then be transferred to index registers 100 as timed by the STORAGE AREA GATE signal. The indexing and downward movement of the image data in index registers 100 and the transfer to a serial register 102 are also timed by the INDEX REGISTER GATE and VERTICAL TRANSFER GATE timing signals, respectively. The output of serial register 102 to an amplifier 104 is controlled and timed by the SERIAL REGISTER GATE signal. Dark reference pixels, if present, are also transferred vertically down to serial register 102 by the use of vertical transfer registers 106 controlled by the VERTICAL TRANSFER GATE signal.

FIG. 7 illustrates the present invention as applied to yet another image sensor technology. Image sensor 110 is a MOS-based sensor with an image area 112 that is line-addressable by an address controller 114. Address controller 114 may receive control signals generated by a circuitry such as signal decoder 60 and the like, which provides the addresses of the lines to be read and displayed. Each line of image data then may be selectively be read out to a serial register 116 by presenting the address for that line and associated control signals. Index registers 116 may then be used to index the image data as controlled and timed by the INDEX REGISTER GATE and VERTICAL TRANSFER GATE signals. A serial register 118 receives the indexed image data and serially outputs them to an amplifier 120. The VERTICAL TRANSFER GATE signal controls vertical transfer registers 122 to transfer the dark reference pixels to serial register 118 without indexing.

Figure 2:
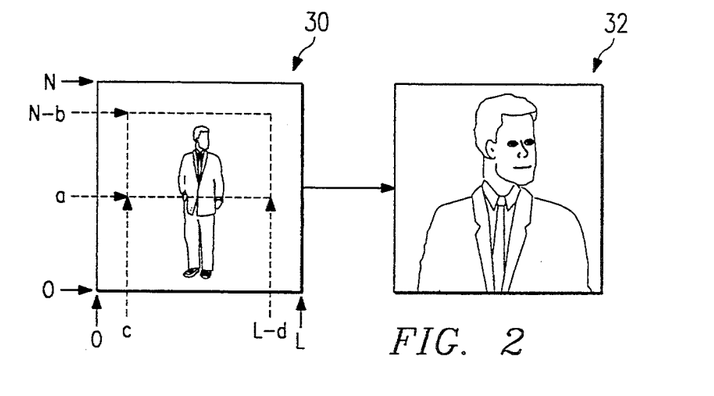
FIG. 2 is a diagram depicting the elements of zooming.
Figure 8:
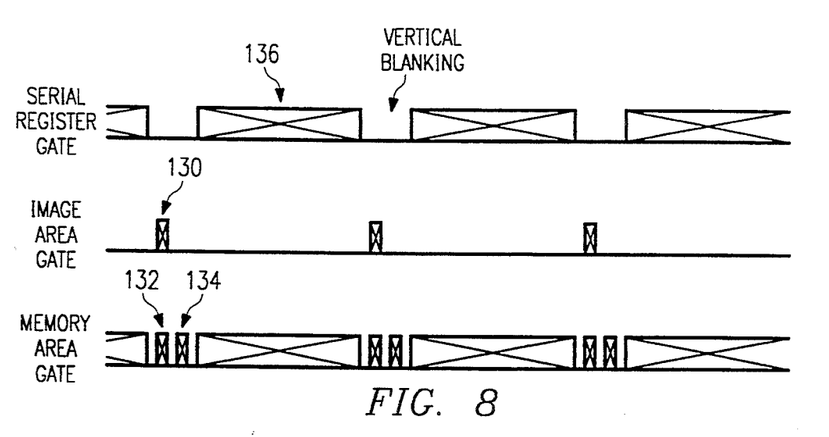
FIG. 8 is a timing diagram illustrating vertical shifting of the image in a frame transfer image sensor.

As shown in the timing diagram for frame transfer image sensor 70 (FIG. 5) in FIG. 8, the IMAGE AREA GATE signal is active, as indicated by pulses 130, during vertical blanking periods to parallel transfer the image data in image area 72 downward and into storage area 76. The active periods of the various timing signals in the timing diagrams represented by logic high levels include a plurality of pulses of predetermined durations for clocking the transfer of the successive horizontal lines of image data. At the same time, image data transferred to storage area 76 are moved downward toward index registers 80 being controlled by the multiple pulses 132 of STORAGE AREA GATE signal. Pulses 134 represent the additional STORAGE AREA GATE pulses used to index the image data vertically to line a, for example, as illustrated in FIG. 2 and discussed above. The image data are therefore indexed to line a in preparation of a zoom operation to furnish image 32 shown in FIG. 2, for example. Accordingly, image data lines 0 to a-1 are discarded and not read out of the serial register. Subsequently, the appropriate number of STORAGE AREA GATE pulses are generated by transfer controller 64 (FIG. 4) to transfer the horizontal lines of image data from lines a to N-b to the index registers and the serial register, where they are read out as timed by pulses 136. Note that although images in image sensor 18 are actually flipped upside down, the images will remain right side up for the purpose of this discussion.

Figure 9:
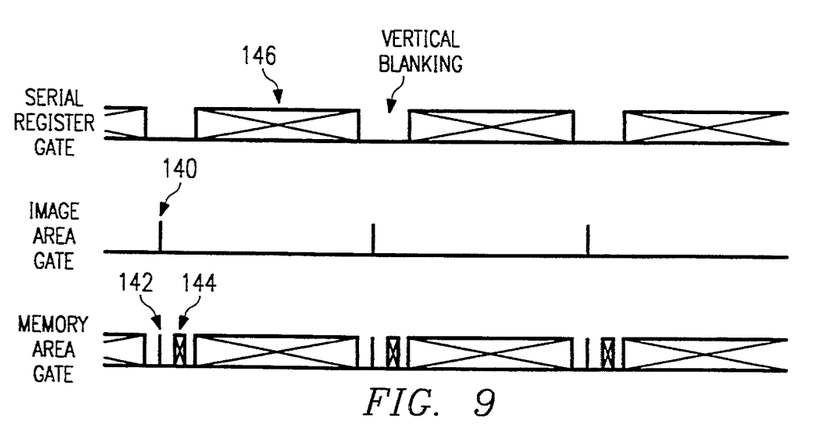
FIG. 9 is a timing diagram illustrating vertical shifting of the image in an interline image sensor.

FIG. 9 shows the same vertical indexing taking place as applied to interline image sensor 90 of FIG. 6. Instead of using multiple pulses to perform the parallel transfer from the image area to the storage area, a single pulse 140 is all that is needed. Timing pulses 142-146 perform essentially the same function as that of the frame transfer image sensor.

The line-addressable capability of MOS-based image sensor 110 shown in FIG. 7 is exploited to achieve vertical indexing. For example, the addresses for lines a to N-b may be generated in response to the zoom commands from pan and zoom select devices 12 to read the image data in those horizontal lines only.

Figure 10:
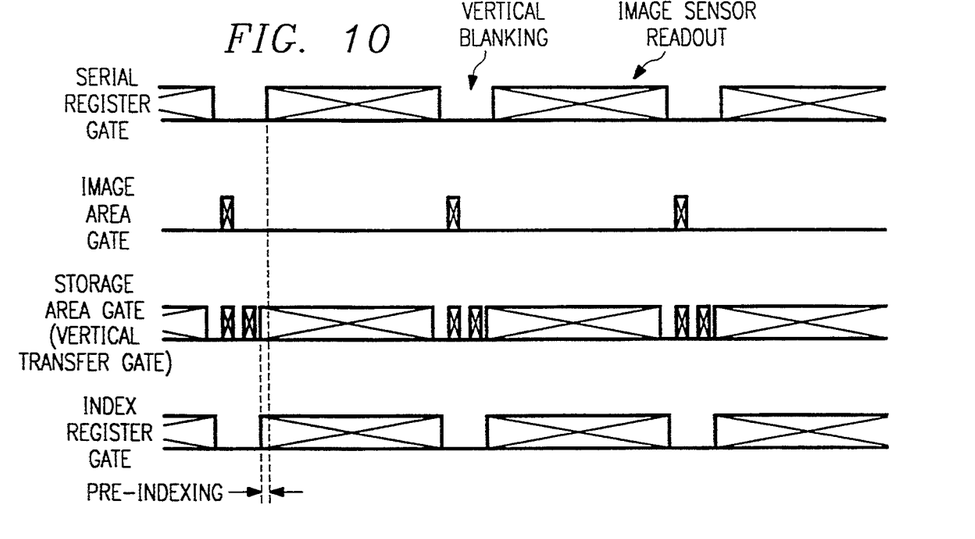
FIG. 10 is a timing diagram illustrating index register gate timing for each frame of image data.
Figure 11:
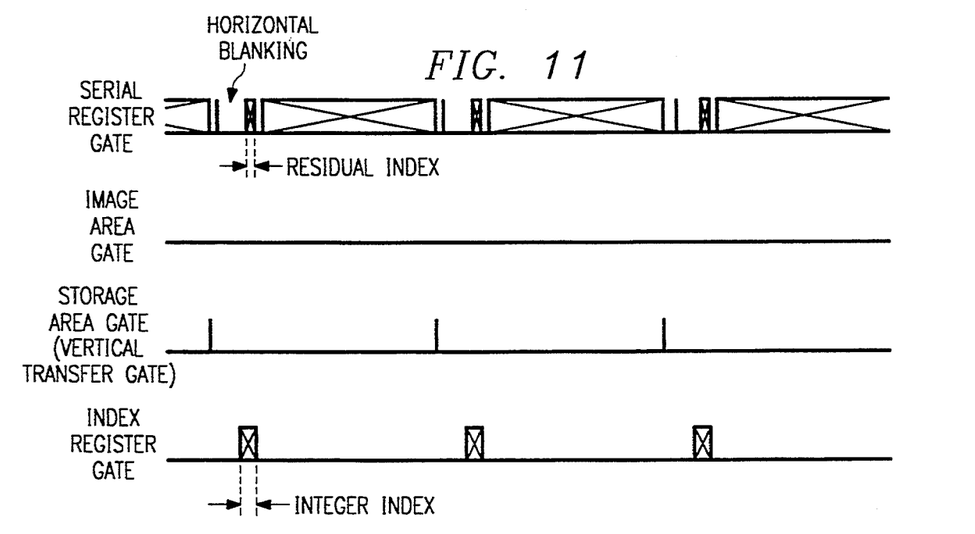
FIG. 11 is a timing diagram illustrating index register gate timing for each line of image data.

To accomplish indexing in the horizontal axis to obtain image data between vertical lines or columns c to L-d, for example, the indexing registers are used to index past the image data in columns 0 to c-1. Referring to FIG. 10 illustrating the timing for processing each frame of image data, and FIG. 11 illustrating the timing for processing each horizontal line of image data, the timing for pre-indexing, integer indexing and residual indexing is shown.

Pre-indexing is the transfer of image data from the storage area to the index registers. The addition of the index registers does not impose any further timing constraints or delays on the image sensor operations since television standards generally allow extra blanked lines in the format to accommodate the vertical return of the display raster or the vertical blanking time. During this time, the lines of image data are fed into the index registers in a sequential order in time so that the lines of image data are fully indexed by the time they are read out of the serial register to the video processor.

Due to the limited amount of time available in the horizontal blanking period to perform indexing, instead of generating and using very high frequency signals to clock the operation, multiple stages of index registers are used, where each index register indexes each line of image data the same predetermined number of pixels. After being forwarded down through all stages of the index registers, the lines of image data should be properly indexed to the desired location, such as location c in the example.

Figure 12:
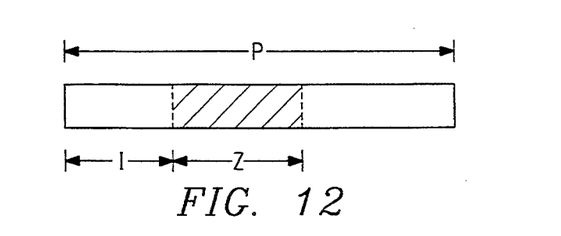
FIG. 12 is a diagram illustrating the dimensions used to compute indexing.

Referring to FIG. 12, if P represents the line of image data, and the number of pixels to be pre-indexed is represented by I, then to arrive at the zoom area Z, the number I may be divided by the number of index registers available to yield the number of pixels each index register shifts or advances. If a residual remains, then the serial register is assigned the task of shifting the residual number of pixels so that the image data representing the portion Z are the only data received by the video processor. As with vertical indexing, the number of pulses needed to read out the desired image data portion up to portion Z is computed and the remainder of image data after portion Z are not used.

The number of index registers to accomplish the needed indexing is largely determined by the amount of time available during the horizontal blanking period to perform this function. The maximum number of pixels that can be indexed, $I_{MAX}$, is determined by:

$$I_{MAX} = P - P/ZOOM\ FACTOR, \quad (1)$$

and the index, I, for indexing is computed by:

$$I = \frac{P - P/ZOOM\ FACTOR.}{2} \quad (2)$$

Since each index register is assigned the task of indexing the same number of pixels, the same INDEX REGISTER GATE clock signal may be used to clock all the index registers.

Once the serial register contains the properly indexed line of image data, it may be clocked by the SERIAL REGISTER GATE signal at a frequency computed by serial register controller 62 (FIG. 4) to yield the proper magnification for the selected zoom function. In general, the frequency for a zoom operation is equal to or less than that used for displaying a full field of view. For example, if a ×2 zoom factor is selected, the serial register should be read out at half the full-field-of-view rate. Since slower frequency clock rates are used during zoom operations, improved amplifier and serial register performance and noise bandwidth reduction are realized.

To perform the panning function, similar vertical and horizontal indexing as described above are done to acquire the desired section of the image data in the image sensor. For example, to pan to the left an X amount as shown in FIG. 3, the image data outside the inner boundary of the image area may be used to provide the additional image information needed to compose the shifted or panned field of view. It may be easily seen that horizontal panning may require horizontal indexing of the lines of image data in the index registers and the serial register to arrive at the desired portion of data to be displayed. Recall that as images are flipped in the image sensor, to pan to the left of the image requires using the image data to the right of the inner boundary in the image area, which may require horizontal indexing. Thus to pan to the right of the image, horizontal indexing is probably not required other than to discard the portion of image data near the end of each horizontal line of data.

Similarly, to shift upward a Y amount as shown in FIG. 3, the image data below the inner boundary in the image area are used to compose the shifted field of view. Vertical indexing is not required if Y represents the entire additional area outside the inner boundary. Conversely, vertical indexing is required if Y is less than the number of horizontal lines outside the inner boundary. To pan downward, vertical indexing is required to discard the lines of data at the bottom of the image area.

Although the present invention has been described in detail, it should be understood that various changes, substitutions and alterations can be made thereto without departing from the spirit and scope of the present invention as defined by the appended claims.

What is claimed is:

1. An image processing system, comprising:
   an image sensor having an image area for generating a plurality of lines and columns of pixel data;
   an operator input device for receiving operator inputs and generating a pan and zoom select signal;
   a timing controller coupled to said image sensor and operator input device for generating an image area timing signal and an index register timing signal in response to said pan and zoom select signal, said image area timing signal vertically indexing said plurality of lines of pixel data by transferring a number of selected lines of pixel data;
   an index register coupled to said timing controller and image sensor for receiving and horizontally indexing said vertically indexed lines of pixel data for further selecting columns thereof in response to said index register timing signal; and a serial register coupled to said index register for outputting said vertically and horizontally indexed lines of pixel data.

2. The system, as set forth in claim 1, wherein said timing controller comprises:
an index calculator for receiving said pan and zoom select signal and generating pan and zoom index values; and
a system timing circuitry coupled to said index calculator for generating said image area timing signal and index register timing signal in response to said pan and zoom index values.

3. The system, as set forth in claim 1, wherein said timing controller comprises:
a man controller for receiving said pan select signal and generating a pan index value;
a zoom controller for receiving said zoom select signal and generating a zoom index value;
vertical and horizontal counters for generating vertical and horizontal video raster scan positions;
an index calculator for receiving said pan and zoom select signal and generating pan and zoom index values; and
a system timing circuitry coupled to said index calculator for generating said image area timing signal and index register timing signal in response to said pan and zoom index values and said vertical and horizontal video raster scan positions.

4. The system, as set forth in claim 1, wherein said timing controller comprises:
an index calculator for receiving said pan and zoom select signal and generating pan and zoom index values; and
a system timing circuitry coupled to said index calculator for generating a predetermined number of timing pulses for said image area timing signal in response to said pan and zoom index values.

5. The system, as set forth in claim 4, wherein said system timing circuitry increases said predetermined number of timing pulses in response to said pan and zoom index values for selecting said number of said plurality of lines of pixel data.

6. The system, as set forth in claim 1, wherein said index register comprises a predetermined number of successive stages, each successive stage being clocked by said index register timing signal for shifting said vertically indexed lines of pixel data by a predetermined number of columns.

7. The system, as set forth in claim 1, wherein said timing controller further generates a serial register clock signal, said timing controller decreasing the frequency of said serial register clock signal in response to said pan and zoom select signal.

8. The system, as set forth in claim 1, wherein said timing controller generates a serial register clock signal, said serial register completing horizontal indexing of said lines of pixel data.

9. Apparatus for performing pan and zoom functions, comprising:
an input device for receiving pan and zoom commands;
an image sensor having an image area for generating a plurality of lines and columns of pixel data;
vertical indexing circuitry coupled to said image sensor for selectively transferring from said image area a number of successive lines of pixel data in response to said pan and zoom commands;
horizontal indexing circuitry coupled to said vertical indexing circuitry for receiving said selected number of successive lines of pixel data and further selecting a number of successive columns of pixel data therefrom for display in response to said pan and zoom commands; and
a serial register coupled to said horizontal indexing circuitry for receiving said selected lines and columns of pixel data.

10. The apparatus, as set forth in claim 9, wherein said serial register serially outputs said lines of pixel data at a predetermined frequency for display.

11. The apparatus, as set forth in claim 9, wherein said serial register serially outputs said lines of pixel data at a reduced frequency for display.

12. The apparatus, as set forth in claim 9, wherein said horizontal indexing circuitry comprises:
an index calculator coupled to said input device and computing pan and zoom index values in response to said pan and zoom commands;
a system timing circuitry coupled to said index calculator for generating an index register timing signal in response to said pan and zoom index values; and
an index register having a plurality of indexing stages coupled successively to one another, each of said stages of said index register successively receiving said selected number of successive lines of pixel data from said vertical indexing circuitry and indexing said lines of pixel data by a predetermined amount in response to said index register timing signal.

13. The apparatus, as set forth in claim 9, wherein said vertical indexing circuitry comprises:
an index calculator coupled to said input device and computing pan and zoom index values in response to said pan and zoom commands;
a system timing circuitry coupled to said index calculator for generating an image area timing signal having a predetermined number of pulses, said system timing circuitry varying said predetermined number in response to said pan and zoom index values; and
said image area transferring said plurality of lines of pixel data in parallel to said horizontal indexing circuitry in response to said image area timing signal.

14. A method for performing pan and zoom functions, comprising the steps of:
receiving pan and zoom commands;
generating a plurality of lines and columns of pixel data in an image area of an image sensor;
selectively transferring from said image area a number of successive lines of pixel data in response to said pan and zoom commands;
receiving said selected number of successive lines of pixel data in an index register and further selecting a number of successive columns of pixel data therefrom for display in response to said pan and zoom commands; and
receiving said selected lines and columns of pixel data in a serial register.

15. The method, as set forth in claim 14, further comprising the step of serially outputting said selected lines and columns of pixel data at a reduced frequency for display.

16. The method, as set forth in claim 14, wherein said selectively transferring step further comprises the steps of:

computing pan and zoom index values in response to said pan and zoom commands;

generating an index register timing signal in response to said pan and zoom index values; and successively shifting each line of pixel data by a predetermined amount for a predetermined number of times in response to said index register timing signal.

17. The method, as set forth in claim 14, wherein said successively shifting step is performed during a horizontal blanking time.

18. The method, as set forth in claim 14, wherein said successive columns of pixel data selecting step further comprises the steps of:

computing pan and zoom index values in response to said pan and zoom commands;

generating an image area timing signal having a predetermined number of pulses, and varying said predetermined number in response to said pan and zoom index values; and vertically indexing said plurality of lines of pixel data in said image area in response to said image area timing signal.

* * * * *